United States Patent
Park et al.

(10) Patent No.: US 8,081,660 B2
(45) Date of Patent: Dec. 20, 2011

(54) METHOD FOR REQUESTING RADIO RESOURCE IN MOBILE COMMUNICATIONS SYSTEM

(75) Inventors: Sung-Jun Park, Gyeonggi-Do (KR); Young-Dae Lee, Gyeonggi-Do (KR); Sung-Duck Chun, Gyeonggi-Do (KR); Myung-Cheul Jung, Seoul (KR)

(73) Assignee: LG Electronics, Inc., Seoul (KR)

( * ) Notice: Subject to any disclaimer, the term of this patent is extended or adjusted under 35 U.S.C. 154(b) by 671 days.

(21) Appl. No.: 12/278,562

(22) PCT Filed: Feb. 5, 2007

(86) PCT No.: PCT/KR2007/000615
§ 371 (c)(1), (2), (4) Date: Aug. 6, 2008

(87) PCT Pub. No.: WO2007/091811
PCT Pub. Date: Aug. 16, 2007

(65) Prior Publication Data
US 2009/0052391 A1    Feb. 26, 2009

Related U.S. Application Data

(60) Provisional application No. 60/771,305, filed on Feb. 7, 2006.

(30) Foreign Application Priority Data

Sep. 12, 2006   (KR) .................. 10-2006-0088274

(51) Int. Cl.
*H04J 3/16*   (2006.01)

(52) U.S. Cl. ..................................... 370/468
(58) Field of Classification Search ................ 370/468, 370/329, 395.21, 352, 335, 342, 338, 345, 370/349, 337; 455/13.1, 522, 69
See application file for complete search history.

(56) References Cited

U.S. PATENT DOCUMENTS
6,138,158 A    10/2000  Boyle et al.
(Continued)

FOREIGN PATENT DOCUMENTS
CN    1658545    8/2005
(Continued)

OTHER PUBLICATIONS

Lee, Y.D., "Method for Transmitting Response Information in Mobile Communications System," U.S. Appl. No. 12/903,109, Oct. 12, 2010.
(Continued)

*Primary Examiner* — Hanh Nguyen
(74) *Attorney, Agent, or Firm* — Lee, Hong, Degerman, Kang & Waimey

(57) ABSTRACT

A method for requesting radio resource using a control signal in an evolved universal telecommunications system (E-UMTS) is disclosed. A terminal requests a radio resource for data transmission from a base station by selectively using the control signal or a random access channel (RACH) if data transmission to the base station is required when the terminal has no uplink radio resource. Fast data transmission is ensured since the terminal can quickly transmit the radio resource request message to the base station using the RACH or the control signal and can quickly acquire the radio resource from the base station.

22 Claims, 3 Drawing Sheets

U.S. PATENT DOCUMENTS

| | | | |
|---|---|---|---|
| 6,317,430 B1 | 11/2001 | Knisely et al. | |
| 6,381,229 B1 | 4/2002 | Narvinger et al. | |
| 6,480,525 B1 | 11/2002 | Parsa et al. | |
| 6,571,102 B1 | 5/2003 | Hogberg et al. | |
| 6,597,668 B1 | 7/2003 | Schafer et al. | |
| 6,694,148 B1 | 2/2004 | Frodigh et al. | |
| 6,728,225 B1 | 4/2004 | Ozluturk | |
| 6,785,510 B2* | 8/2004 | Larsen | 455/11.1 |
| 6,795,412 B1 | 9/2004 | Lee | |
| 6,850,504 B1* | 2/2005 | Cao et al. | 370/335 |
| 6,859,445 B1 | 2/2005 | Moon et al. | |
| 6,882,727 B1 | 4/2005 | Vialen et al. | |
| 6,907,005 B1 | 6/2005 | Dahlman et al. | |
| 6,907,015 B1 | 6/2005 | Moulsley et al. | |
| 6,947,394 B1 | 9/2005 | Johansson et al. | |
| 6,950,420 B2 | 9/2005 | Sarkkinen et al. | |
| 6,965,580 B1 | 11/2005 | Takagi et al. | |
| 7,016,343 B1 | 3/2006 | Mermel et al. | |
| 7,031,708 B2 | 4/2006 | Sarkkinen et al. | |
| 7,075,971 B2 | 7/2006 | Parsa et al. | |
| 7,099,309 B2 | 8/2006 | Davidson | |
| RE39,454 E | 1/2007 | Cantoni et al. | |
| 7,236,787 B1 | 6/2007 | Tamura et al. | |
| 7,359,345 B2 | 4/2008 | Chang et al. | |
| 7,376,424 B2 | 5/2008 | Kim et al. | |
| 7,385,952 B2* | 6/2008 | Mantha et al. | 370/329 |
| 7,398,108 B2 | 7/2008 | Hondo | |
| 7,430,206 B2 | 9/2008 | Terry et al. | |
| 7,436,801 B1 | 10/2008 | Kanterakis | |
| 7,496,113 B2 | 2/2009 | Cai et al. | |
| 7,535,886 B2 | 5/2009 | Lee et al. | |
| 7,664,059 B2 | 2/2010 | Jiang | |
| 7,839,829 B2 | 11/2010 | Lee et al. | |
| 7,843,877 B2 | 11/2010 | Lee et al. | |
| 7,848,308 B2 | 12/2010 | Lee et al. | |
| 2001/0024956 A1 | 9/2001 | You | |
| 2002/0009129 A1 | 1/2002 | Choi | |
| 2002/0021714 A1 | 2/2002 | Seguin | |
| 2002/0032884 A1 | 3/2002 | Kobata et al. | |
| 2002/0044527 A1 | 4/2002 | Jiang | |
| 2002/0071480 A1 | 6/2002 | Marjelund et al. | |
| 2002/0090004 A1 | 7/2002 | Rinchiuso | |
| 2002/0093940 A1 | 7/2002 | Toskala | |
| 2002/0126629 A1 | 9/2002 | Jiang et al. | |
| 2002/0160744 A1 | 10/2002 | Choi | |
| 2002/0181436 A1 | 12/2002 | Mueckenheim | |
| 2002/0187789 A1 | 12/2002 | Diachina | |
| 2002/0191559 A1 | 12/2002 | Chen et al. | |
| 2003/0003920 A1 | 1/2003 | Sebastian | |
| 2003/0007510 A1 | 1/2003 | Yeo et al. | |
| 2003/0043741 A1 | 3/2003 | Mukai et al. | |
| 2003/0054829 A1 | 3/2003 | Moisio | |
| 2003/0076812 A1 | 4/2003 | Benedittis | |
| 2003/0103476 A1 | 6/2003 | Choi et al. | |
| 2003/0137931 A1 | 7/2003 | Hans et al. | |
| 2003/0139170 A1 | 7/2003 | Heo | |
| 2003/0147371 A1 | 8/2003 | Choi | |
| 2003/0210669 A1 | 11/2003 | Vayanos et al. | |
| 2003/0223393 A1 | 12/2003 | Lee | |
| 2003/0236085 A1 | 12/2003 | Ho | |
| 2004/0002334 A1 | 1/2004 | Lee et al. | |
| 2004/0006643 A1 | 1/2004 | Dolson et al. | |
| 2004/0008658 A1 | 1/2004 | Dahlman et al. | |
| 2004/0008659 A1 | 1/2004 | Kim | |
| 2004/0014452 A1 | 1/2004 | Lim et al. | |
| 2004/0028078 A1 | 2/2004 | Beckmann | |
| 2004/0057387 A1 | 3/2004 | Yi et al. | |
| 2004/0077357 A1 | 4/2004 | Nakada | |
| 2004/0097192 A1 | 5/2004 | Schiff | |
| 2004/0114606 A1 | 6/2004 | Haddad | |
| 2004/0116143 A1 | 6/2004 | Love et al. | |
| 2004/0117860 A1 | 6/2004 | Yi et al. | |
| 2004/0125772 A9 | 7/2004 | Wu et al. | |
| 2004/0127223 A1 | 7/2004 | Li et al. | |
| 2004/0147266 A1 | 7/2004 | Hwang et al. | |
| 2004/0157602 A1 | 8/2004 | Khawand | |
| 2004/0171395 A1 | 9/2004 | Shin | |
| 2004/0185860 A1 | 9/2004 | Marjelund | |
| 2004/0196861 A1 | 10/2004 | Rinchiuso et al. | |
| 2004/0198369 A1 | 10/2004 | Kwak et al. | |
| 2004/0202140 A1 | 10/2004 | Kim et al. | |
| 2004/0208160 A1 | 10/2004 | Petrovic et al. | |
| 2004/0229626 A1 | 11/2004 | Yi et al. | |
| 2004/0264497 A1 | 12/2004 | Wang et al. | |
| 2004/0264550 A1 | 12/2004 | Dabak | |
| 2005/0008035 A1 | 1/2005 | Eklund et al. | |
| 2005/0014508 A1 | 1/2005 | Moulsley et al. | |
| 2005/0020260 A1 | 1/2005 | Jeong et al. | |
| 2005/0025039 A1 | 2/2005 | Hwang et al. | |
| 2005/0054368 A1 | 3/2005 | Amerga | |
| 2005/0059421 A1* | 3/2005 | Reed et al. | 455/522 |
| 2005/0073987 A1 | 4/2005 | Wu | |
| 2005/0105482 A1 | 5/2005 | Kobayashi et al. | |
| 2005/0107036 A1 | 5/2005 | Song et al. | |
| 2005/0118947 A1 | 6/2005 | Ames et al. | |
| 2005/0157696 A1 | 7/2005 | Yamamoto et al. | |
| 2005/0185608 A1 | 8/2005 | Lee et al. | |
| 2005/0190728 A1 | 9/2005 | Han et al. | |
| 2005/0197134 A1 | 9/2005 | McKenna et al. | |
| 2005/0213605 A1 | 9/2005 | Kim et al. | |
| 2005/0243767 A1 | 11/2005 | Zhang et al. | |
| 2005/0249141 A1 | 11/2005 | Lee et al. | |
| 2005/0250500 A1 | 11/2005 | Xu | |
| 2005/0260997 A1 | 11/2005 | Korale | |
| 2005/0265301 A1 | 12/2005 | Heo et al. | |
| 2005/0271025 A1 | 12/2005 | Guethaus et al. | |
| 2005/0281212 A1 | 12/2005 | Jeong et al. | |
| 2005/0288026 A1 | 12/2005 | Byun et al. | |
| 2006/0007886 A1 | 1/2006 | Lee et al. | |
| 2006/0018289 A1 | 1/2006 | Schulist et al. | |
| 2006/0025079 A1 | 2/2006 | Sutskover et al. | |
| 2006/0045047 A1 | 3/2006 | Choi et al. | |
| 2006/0059186 A1 | 3/2006 | Backlund | |
| 2006/0062196 A1 | 3/2006 | Cai et al. | |
| 2006/0193282 A1 | 8/2006 | Ikawa et al. | |
| 2006/0256818 A1 | 11/2006 | Shvodian et al. | |
| 2007/0047468 A1 | 3/2007 | Sumiyoshi et al. | |
| 2007/0099619 A1 | 5/2007 | Parekh et al. | |
| 2007/0140115 A1 | 6/2007 | Bienas et al. | |
| 2007/0147326 A1 | 6/2007 | Chen | |
| 2007/0206531 A1 | 9/2007 | Pajukoski et al. | |
| 2008/0095105 A1 | 4/2008 | Sundberg et al. | |
| 2008/0304410 A1 | 12/2008 | Park et al. | |
| 2009/0010219 A1 | 1/2009 | Lee et al. | |
| 2009/0011769 A1 | 1/2009 | Park et al. | |
| 2009/0022134 A1 | 1/2009 | Chun et al. | |
| 2009/0028125 A1 | 1/2009 | Chun et al. | |
| 2009/0036061 A1 | 2/2009 | Chun et al. | |
| 2009/0052391 A1 | 2/2009 | Park et al. | |
| 2009/0175241 A1 | 7/2009 | Ohta et al. | |
| 2009/0185477 A1 | 7/2009 | Lee et al. | |
| 2009/0257407 A1 | 10/2009 | Park et al. | |
| 2010/0014430 A1 | 1/2010 | Oka et al. | |
| 2010/0034095 A1 | 2/2010 | Ho et al. | |
| 2010/0105334 A1 | 4/2010 | Terry et al. | |
| 2010/0290400 A1 | 11/2010 | Lee et al. | |

FOREIGN PATENT DOCUMENTS

| | | |
|---|---|---|
| EP | 1009184 | 6/2000 |
| EP | 1261222 | 11/2002 |
| EP | 1392074 | 2/2004 |
| EP | 1557968 | 7/2005 |
| EP | 1599063 | 11/2005 |
| EP | 1605724 | 12/2005 |
| EP | 1684538 | 7/2006 |
| JP | 06-013959 | 1/1994 |
| JP | 09-327072 | 12/1997 |
| JP | 11-308671 | 11/1999 |
| JP | 11-331949 | 11/1999 |
| JP | 2000-032088 | 1/2000 |
| JP | 2000-151494 | 5/2000 |
| JP | 2000-175271 | 6/2000 |
| JP | 2000-184428 | 6/2000 |
| JP | 2001-095031 | 4/2001 |
| JP | 2001-298770 | 10/2001 |
| JP | 2002-135231 | 5/2002 |
| JP | 2003-333661 | 11/2003 |

| | | |
|---|---|---|
| JP | 2004-320165 | 11/2004 |
| JP | 2004-349884 | 12/2004 |
| JP | 2005500761 | 1/2005 |
| JP | 2005-517369 | 6/2005 |
| JP | 2005-237013 | 9/2005 |
| JP | 2005-244958 | 9/2005 |
| JP | 2005-278167 | 10/2005 |
| JP | 2005-536168 | 11/2005 |
| JP | 2006-014372 | 1/2006 |
| JP | 2006-020044 | 1/2006 |
| JP | 2006-505998 | 2/2006 |
| KR | 1020010111634 | 12/2001 |
| KR | 1020010111637 | 12/2001 |
| KR | 20040048675 | 6/2004 |
| KR | 1020040048675 | 6/2004 |
| KR | 20040064867 | 7/2004 |
| KR | 1020040064867 | 7/2004 |
| KR | 20040089937 | 10/2004 |
| KR | 1020040089937 | 10/2004 |
| RU | 2168278 | 5/2001 |
| RU | 2191479 | 10/2002 |
| RU | 2227372 | 4/2004 |
| RU | 2232469 | 7/2004 |
| RU | 2232477 | 7/2004 |
| RU | 2237380 | 9/2004 |
| RU | 2263415 | 10/2005 |
| RU | 2270526 | 2/2006 |
| RU | 2009106289 | 8/2010 |
| TW | 407407 | 10/2000 |
| TW | 552815 | 9/2003 |
| TW | 586283 | 5/2004 |
| TW | 589818 | 6/2004 |
| TW | 592412 | 6/2004 |
| TW | 1228008 | 2/2005 |
| TW | 1229268 | 3/2005 |
| TW | 1229514 | 3/2005 |
| TW | 1237478 | 8/2005 |
| TW | 1239731 | 9/2005 |
| TW | 1239756 | 9/2005 |
| TW | 280755 | 5/2007 |
| WO | 99/63713 | 12/1999 |
| WO | 02/39760 | 5/2002 |
| WO | 2002/039697 | 5/2002 |
| WO | 02/47417 | 6/2002 |
| WO | 02/075442 | 9/2002 |
| WO | 02/102110 | 12/2002 |
| WO | 03/007636 | 1/2003 |
| WO | 03/017691 | 2/2003 |
| WO | 03/043259 | 5/2003 |
| WO | 03/056723 | 7/2003 |
| WO | 03/096571 | 11/2003 |
| WO | 2004/034656 | 4/2004 |
| WO | 2004045234 | 5/2004 |
| WO | 2004/089030 | 10/2004 |
| WO | 2005/006660 | 1/2005 |
| WO | 2005/055472 | 6/2005 |
| WO | 2005/074312 | 8/2005 |
| WO | 2005/088886 | 9/2005 |
| WO | 2005/099125 | 10/2005 |
| WO | 2005/109837 | 11/2005 |
| WO | 2005/117317 | 12/2005 |
| WO | 2005/119941 | 12/2005 |
| WO | 2005/125125 | 12/2005 |
| WO | 2006/011953 | 2/2006 |
| WO | 2007091831 | 8/2007 |

OTHER PUBLICATIONS

Lee, Y.D., "Method for Transmitting Response Information in Mobile Communications System," U.S. Appl. No. 12/903,127, Oct. 12, 2010.

Ericsson, "E-Utra Random Access," TSG-RAN WG1 #43, R1-051445, Nov. 7, 2005.

M. Haardt et al., "The TD-CDMA Based Utra TDD Mode," IEEE Journal on Selected Areas in Communications, vol. 18, No. 8, pp. 1375-1385, Aug. 2000.

Siemens, "States in E-Utran," R2-052051, 3GPP TSG-RAN WG RAN2#48, Aug. 2005.

China Mobile Communications Co., "RRC States Analysis in LTE," R2-052140, 3GPP TSG RAN WG2 #48, Aug. 2005.

Qualcomm Europe, "Signaling optimization for E-UTRAN," R2-052407, 3GPP TSG-RAN WG 2 meeting #48-bis, Oct. 2005.

Panasonic, "E-UTRA Transport and Logical Channels," R2-052860, 3GPP TSG RAN WG2#49, Nov. 2005.

Sarkar, S., et al., "Common-Channel Soft Handoff in CDMA2000," IEEE Transactions on Microwave Theory and Techniques, Jun. 2000, pp. 938-950, vol. 48, Issue 6.

NTT Docomo et al., "Multiplexing Method of Shared Control Channel in Uplink Single-Carrier FDMA Radio Access," 3GPP TSG-RAN WG1, R1-051143, Oct. 10, 2005.

Huawei, "Further Considerations on Multiplexing Method of Shared Control Channel in Uplink Single-Carrier FDMA," 3GPP TSG-RAN WG1, R1-051430, Nov. 7, 2005.

Philips, "Evolved Paging Indicators for LTE," 3GPP TSG-RAN WG2, R2-052985, Nov. 7, 2005.

NTT Docomo, et al., "Paging Channel Structure for E-UTRA Downlink," 3GPP TSG-RAN WG1, R1-060034, Jan. 23, 2006.

LG Electronics Inc., "HARQ and ARQ Operation," 3GPP TSG-RAN WG2, R2-060106, Jan. 9, 2006.

LG Electronics Inc., "Framing in the MAC Entity," 3GPP TSG-RAN WG2, R2-061012, Mar. 27, 2006.

Motorola, "Paging Channel Design for E-UTRA," 3GPP TSG-RAN WG1, R1-061712, Jun. 27, 2006.

Xu, H., et al.; "Performance Analysis on the Radio Link Control Protocol of UMTS System"; 2002 IEEE 56th Vehicular Technology Conference Proceedings; pp. 2026-2030; Sep. 2002.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 v8.4.0, Dec. 2008.

Qualcomm, "Need for MAC-hs segmentation mechanism," R2-020769, 3GPP TSG-RAN WG2 meeting #28, Apr. 2002.

Motorola et al., "MAC-e/es header and functional split," R2-042360, 3GPP TSG RAN WG2 Meeting#45, Nov. 2004.

Ericsson, "User plane protocol enhancements," R2-052749, TSG-RAN WG2 Meeting #48bis, Oct. 2005.

LG Electronics Inc., "MAC Enhancement," R2-060561, 3GPP TSG-RAN WG2 #51, Feb. 2006.

* cited by examiner

METHOD FOR REQUESTING RADIO RESOURCE IN MOBILE COMMUNICATIONS SYSTEM

This application is a national stage application of international application no. PCT/KR2007/000615, filed on Feb. 5, 2007, which claims the benefit and right of priority to U.S. Provisional Application No. 60/771,305, filed on Feb. 7, 2006 and Korean application No. 10-2006-0088274, filed on Sep. 12, 2006.

FIELD OF THE INVENTION

The present invention relates to a multimedia broadcast/multicast service (MBMS) service, and particularly, to a method for transmitting information for supporting mobility of a terminal and providing an MBMS service.

DESCRIPTION OF THE RELATED ART

FIG. 1 illustrates a network structure of an E-UMTS, which is a mobile communications system to which both the related art and the present invention are directed. The E-UMTS system is a system that has evolved from an existing UMTS system.

Basic standardization for the E-UMTS system is currently being developed by a Third Generation Partnership Project (3GPP). The E-UMTS system may be referred to as a Long Term Evolution (LTE) system.

As illustrated in FIG. 1, an E-UMTS network may consist of an E-UTRAN and a Core Network (CN). The E-UTRAN may include User Equipment (UE), a base station, referred to as eNode B or eNB, and an Access Gateway (AG) located at the end of the network and connected to an external network.

The AG may be classified into a portion for processing user traffic and a portion for processing control traffic. The AG portion for processing user traffic and the AG portion for processing control traffic may be connected to each other via a new interface for communication.

One or more cells may exist in an eNode B (eNB). The eNode Bs may be connected by an interface for the transmission of user traffic or control traffic.

The CN may also include the AG and a node for registering a user of the UE. An interface may also be provided in the E-UMTS in order to classify the E-UTRAN and the CN.

Radio interface protocol layers between a mobile terminal and network may be classified into a first layer (L1), a second layer (L2) and a third layer (L3) based upon the lower three layers of an Open System Interconnection (OSI) model which is well known in communications systems. A physical layer of the first layer provides an information transfer service using a physical channel. A Radio Resource Control (RRC) layer positioned in the third layer controls radio resources between the mobile terminal and the network.

The RRC layer exchanges RRC messages between the mobile terminal and the network. The RRC layer may be positioned in each network node, such as the eNode B and the AG, or positioned in either the eNode B or the AG.

FIG. 2 illustrates architecture of control plane of a radio interface protocol between a terminal and a UMTS Terrestrial Radio Access Network (UTRAN) based upon a 3GPP radio access network specification. The radio interface protocol of FIG. 2 are horizontally represented by a physical layer, a data link layer and a network layer and vertically represented by a user plane for transmitting data and the control plane for transmitting control signals.

The protocol layers of FIG. 2 may be classified into a first layer (L1), a second layer (L2) and a third layer (L3) based upon the lower three layers of an Open System Interconnection (OSI) model which is well known in communications systems. Each radio protocol layer in the control plane illustrated in FIG. 2 and each radio protocol layer in the user plane illustrated in FIG. 3 will now be explained.

A physical layer, which is a first layer, provides an information transfer service to an upper layer using a physical channel. The physical layer is connected to a Medium Access Control (MAC) layer located thereabove via a transport channel.

Data is transferred between the MAC layer and the physical layer via a transport channel. Data also is transferred between different physical layers, specifically, between a physical layer of a transmitting side and a physical layer of a receiving side.

A MAC layer of the second layer provides a service via a logical channel to a Radio Link Control (RLC) layer, which is its upper layer. The RLC layer of the second layer supports reliable data transmission.

It should be noted that the RLC layer is depicted in dotted lines, because if the RLC functions are implemented in and performed by the MAC layer, the RLC layer itself may not need to exist.

A Packet Data Convergence Protocol (PDCP) layer of the second layer is used to effectively transmit data using an IP packet, such as IPv4 or IPv6, on a radio interface with a relatively narrow bandwidth. The PDCP layer performs header compression to reduce the size of a relatively-large IP packet header containing unnecessary control information.

A Radio Resource Control (RRC) layer located at the lowest portion of the third layer is only defined in the control plane. The RRC layer handles the transport and physical channels for the configuration, re-configuration and release of radio bearers. A Radio Bearer (RB) denotes a service provided by the second layer for data transfer between the mobile terminal and the UTRAN.

Downlink transport channels for transmitting data from a network to a mobile terminal may include a Broadcast Channel (BCH) for transmitting system information and a downlink Shared Channel (SCH) for transmitting user traffic or control messages. The user traffic or control messages of a downlink multicast service or broadcast service may be transmitted either via the downlink SCH or via an additional downlink Multicast Channel (MCH). Uplink transport channels for transmitting data from a mobile terminal to a network may include a Random Access Channel (RACH) for transmitting an initial control message and an uplink Shared Channel (SCH) for transmitting a user traffic or control messages.

Hereinafter, a random access channel (RACH) will be explained in detail. In general, an RACH is used to obtain a radio resource if there is no uplink radio resource to transmit data when a terminal synchronizes with a network or the terminal transmits the corresponding data for an uplink.

For example, a terminal generally synchronizes for a downlink to enable reception of system information from a cell it desires to access when the terminal is turned on. The terminal should transmit an access request message to the network or base station for an RRC connection after receiving the system information. However, the terminal uses the RACH if it does not currently synchronize with the network and does not acquire an uplink radio resource.

In other words, the terminal requests a radio resource for transmitting an access request message to the network using the RACH. The base station then allocates an appropriate radio resource to the terminal in order to allow the terminal to transmit an RRC connection message. The terminal can then transmit the RRC connection message to the network using the allocated radio resource.

In another example, the terminal acquires a radio resource from the network according to radio resource scheduling and transmits data to the network using the allocated radio resource when the terminal forms an RRC connection with the network. However, the network may not allocate the uplink radio resource if there is no data left in the terminal buffer because it is inefficient to allocate an uplink radio resource to a terminal that has no data to transmit. The state of the terminal buffer is reported to the network periodically or according to an event generation. If new data that does not require a radio resource is generated in the buffer, the terminal uses the RACH because it does not currently have the uplink radio resource allocated. In other words, the terminal requests a radio resource required for data transmission to the network using the RACH.

Hereinafter, a RACH in a Wideband Code Division Multiple Access (WCDMA) will be explained. The RACH channel is used to transmit data with a short length over an uplink.

A portion of RRC messages, such as an RRC connection request message, a cell update message or a URA update message, may be transmitted on the RACH. A logical channel CCCH (Common Control Channel), DCCH (Dedicated Control Channel) and DTCH (Dedicated Traffic Channel) are mapped to the RACH and the RACH is mapped to a physical channel PRACH (Physical Random Access Channel).

The physical layer of a terminal selects one access slot and one signature to transmit a PRACH preamble via an uplink when a MAC layer of the terminal indicates a PRACH transmission to a physical layer of the terminal. The preamble is transmitted for an access slot interval having a length of 1.33 ms. One of 16 signatures is selected and transmitted for a certain length of an initial portion of the access slot.

The base station transmits a response signal using a downlink physical channel AICH (Acquisition Indicator Channel) after the terminal transmits the preamble. The AICH transmitted in response to the preamble transmits the signature selected by the preamble for a certain length of the initial portion of the access slot corresponding to the transmitted access slot.

The base station transmits a positive response (ACK) or negative response (NACK) to the terminal using the signature transmitted from the AICH. The terminal transmits a message portion with a length of 10 ms or 20 ms using an OVSF code corresponding to the transmitted signature upon receiving the ACK. The MAC layer of the terminal indicates the PRACH transmission again to the physical layer of the terminal after an appropriate time period upon receiving the NACK. The terminal transmits a new preamble using power one level higher than that of the previous preamble after a designated access slot if the terminal has not received the AICH corresponding to a previously transmitted preamble.

Channel Quality Indication (CQI) information is information that is enable a terminal to measure a downlink channel state in a current cell and provide the measured state to the base station. The base station then performs radio resource scheduling using the provided CQI information. For example, if the value of CQI may be from 1 to 10, 1 indicates that a channel is not in a good state and 10 indicates that the channel is in a good state.

The base station may determine that the current downlink channel is in a good state and transmit data to the terminal according to a higher bit rate when the terminal transmits CQI information of 10 to the base station. Conversely, the base station may determine that the downlink channel is not in a good state and transmit data to the terminal according to a lower bit rate when the terminal transmits CQI information of 1 to the base station. The base station previously informs the terminal that the terminal should perform reporting periodically or according to an event generation in order to transmit the CQI information.

Another example of the control signals from the terminal to the base station is ACK/NACK signaling of hybrid automatic repeat and request (HARQ). HARQ refers to the operation obtained by combining ARQ executed by the RLC layer with forward error correction executed by the physical layer.

In other words, the terminal requests re-transmission of data from the base station and again receives the data if it is determined that the data received from the MAC layer and the physical layer has errors. The receiver (terminal) transmits ACK signaling to the transmitter if reception is successfully executed and transmits NACK signaling to the transmitter if reception fails in order to notify the status of the data received from the transmitter (base station). The transmitter determines whether to re-transmit corresponding data depending on the ACK/NACK signaling.

Other example of the control signals from the terminal to the base station is a status report message of the RLC layer. The RLC layer executes ARQ to transmit data with reliability. In other words, the transmitter appends a sequence number to each data unit while the receiver identifies the sequence number of the data unit received from the RLC layer to determine whether all the data have been transmitted.

For example, when the transmitter has transmitted first to tenth data units to the receiver and the RLC layer of the receiver has received eight data units normally, corresponding to the first to fifth data units and the eighth to tenth data units, it notifies the transmitter through the status report message that the sixth and seventh data units have not been received correctly and the other data units have been received correctly. Accordingly, the transmitter re-transmits the sixth and seventh data units to the receiver after receiving the status report message.

In related art methods, a terminal in the RRC connected state that has no uplink radio resource uses the RACH to request that the base station provide the radio resource for data transmission if data transmission to the base station is required. However, a problem occurs if the terminal uses the RACH because the terminal request may collide with requests from other terminals. For example, collision occurs and delay time for request of the radio resource increases if two or more terminals transmit the RACH preamble at the same time and the same resource by using the same signature.

Furthermore, a terminal that uses the RACH should wait as much as the next allocation period of the RACH resource. For example, the terminal should wait as much as 10 ms to use the RACH if the allocation period of the RACH resource is 10 ms.

Moreover, when a terminal in the RRC connected state having no uplink radio resource needs to transmit data to the base station and all the terminals use the RACH to request the radio resource, allocation of the RACH resource would increase accordingly. Under these circumstances, collision between transmissions from the terminals occurs and delay time increases as much as the allocation period of the RACH resource. Furthermore, problems occur when the amount of the RACH resource increases as all the terminals request the radio source through the RACH.

SUMMARY OF THE INVENTION

An object of the present invention is to provide a method for quickly acquiring a radio resource from a base station using a control signal for an uplink as well as RACH.

In one aspect of the present invention, a method for scheduling radio resources in a mobile communications system is provided. The method includes transmitting a control signal including an indication that a radio resource is requested, receiving a first allocated radio resource and transmitting a message using the first allocated radio resource.

It is contemplated that the message includes a request for a second radio resource if an amount of data left to transmit is more than an amount of data that can be transmitted using the first allocated radio resource or the message includes only data if the amount of data left to transmit is less than or equal to the amount of data that can be transmitted using the first allocated radio resource. It is further contemplated that the message is a request for a second radio resource and the method further includes receiving a second allocated radio resource and transmitting data using the second allocated radio resource.

It is contemplated that the request for the radio resource includes data. It is further contemplated that the control signal includes one of CQI information, an ACK/NACK and a status report message.

In another aspect of the present invention, a method for scheduling radio resources in a mobile telecommunications system is provided. The method includes transmitting an indication that a radio resource is requested, the indication included in one of a preamble transmitted over a random access channel (RACH) and a control signal transmitted over a control channel, receiving a first allocated radio resource, transmitting a request for a second radio resource using the first allocated radio resource, the request including data, receiving a second allocated radio resource and transmitting data using the second allocated radio resource.

It is contemplated that transmitting the indication that a radio resource is requested includes calculating a first time required to acquire the radio resource using the RACH and a second time required to acquire the radio resource using the control signal and determining which of the calculated first time and second time is less. It is further contemplated that transmitting the indication that a radio resource is requested includes determining a data service type and including the indication that a radio resource is requested in the preamble if the data service type is susceptible to delay time or including the indication that a radio resource is requested in the control signal if the data service type is not susceptible to delay time. Preferably, transmitting the indication that a radio resource is requested includes determining a data service priority, calculating a first time required to acquire the radio resource using the RACH and a second time required to acquire the radio resource using the control signal and including the indication in one of the preamble and the control signal according to which of the calculated first time and second time is less if the data service is determined to have high priority or including the indication in the control signal if the data service is determined to have a low priority.

In another aspect of the present invention, a method for scheduling radio resources in a mobile telecommunications system is provided. The method includes receiving a control signal including an indication that a radio resource is requested, transmitting a first allocated radio resource and receiving a message transmitted using the first allocated radio resource.

It is contemplated that the message includes a request for a second radio resource if an amount of data left to transmit in a mobile terminal that transmitted the message is more than an amount of data that can be transmitted using the first allocated radio resource or the message includes only data if the amount of data left to transmit in the mobile terminal is less than or equal to the amount of data that can be transmitted using the first allocated radio resource. It is further contemplated that the message is a request for a second radio resource and the method further includes transmitting a second allocated radio resource and receiving data transmitted using the second allocated radio resource.

It is contemplated that the request for the radio resource includes data. It is further contemplated that the method further includes determining whether data is left for transmission in a mobile terminal from which the message was received. Preferably, the control signal includes one of CQI information, an ACK/NACK and a status report message.

In another aspect of the present invention, a method for scheduling radio resources in a mobile telecommunications system is provided. The method includes receiving an indication that a radio resource is requested, the indication included in one of a preamble transmitted over a random access channel (RACH) and a control signal transmitted over a control channel, transmitting a first allocated radio resource, receiving a request for a radio resource transmitted using the first allocated radio resource, the request including data, transmitting a second allocated radio resource and receiving data transmitted using the second allocated radio resource.

It is contemplated that the indication that a radio resource is requested in received in the preamble if a time required for a mobile communication terminal transmitting the indication to acquire the radio resource using the RACH is less than a time required for the mobile communication terminal to acquire the radio resource using the control signal or the indication is received in the control signal if the time required for the mobile communication terminal to acquire the radio resource using the RACH is more than the time required for the mobile communication terminal to acquire the radio resource using the control signal. It is further contemplated that the indication that a radio resource is requested in received the preamble if a data service type is susceptible to delay time and the indication is received in the control signal if the data service type is not susceptible to delay time. Preferably, the indication that a radio resource is requested is received in the preamble if a data service has high priority and a time required for a mobile communication terminal transmitting the indication to acquire the radio resource using the RACH is less than a time required for the mobile communication terminal to acquire the radio resource using the control signal or the indication that a radio resource is requested is received in the control signal if the data service has low priority or the data service has high priority and the time required for the mobile communication terminal to acquire the radio resource using the RACH is more than the time required for the mobile communication terminal to acquire the radio resource using the control signal.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit of the invention as defined by the appended claims.

The present invention is disclosed with respect to a mobile telecommunications system such as E-UMTS. However, the present invention may be applied to a telecommunications system operated under other standards.

The present invention provides a method for allowing a terminal to request a radio resource by using a control signal for an uplink as well as RACH if data transmission to a base station is required when the terminal is in RRC connected state and has no uplink radio resource. Preferably, the control signal include one of CQI information representing the channel status of a downlink, ACK/NACK signaling of HARQ, and status report messages of the RLC layer. Preferably, the terminal transmits a radio resource allocation request message to the base station (eNode-B) and the base station executes scheduling of the radio resource.

Figure 1:
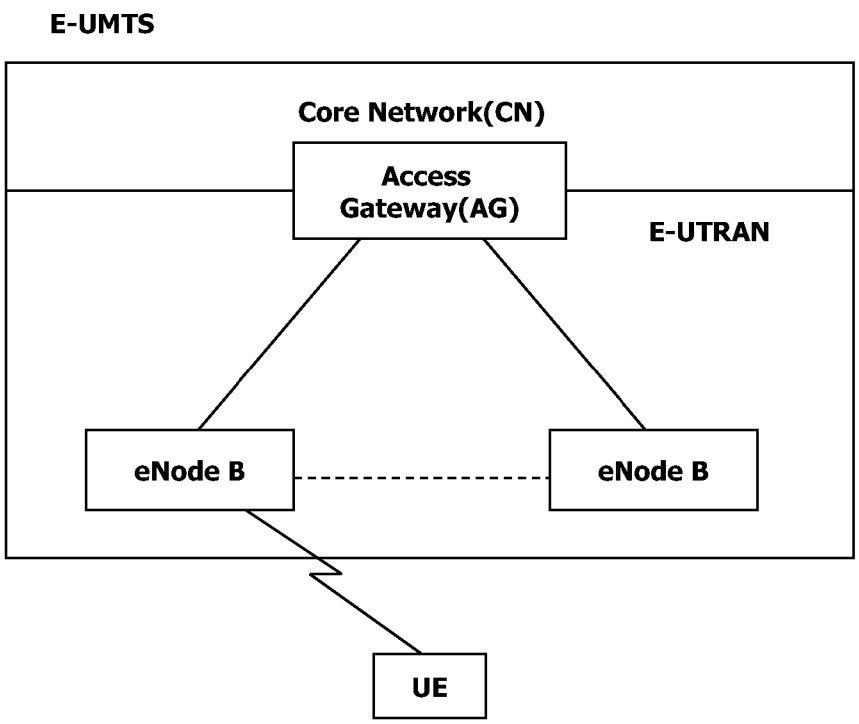
FIG. 1 illustrates a network structure of an E-UMTS that is a mobile telecommunications system to which the related art and the present invention are applied.
Figure 2:
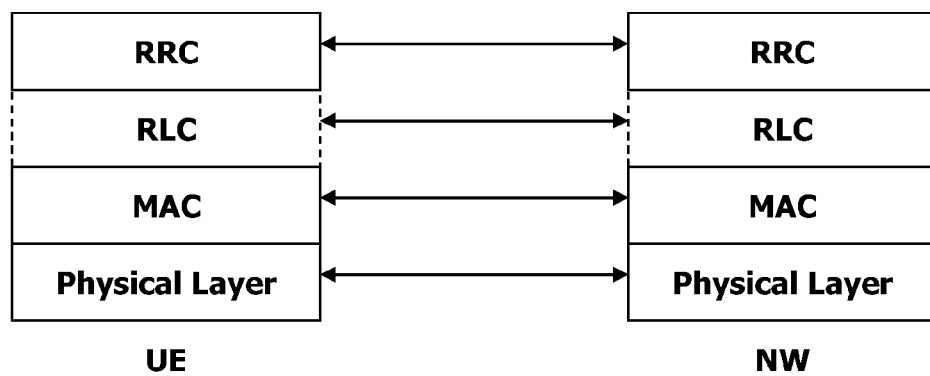
FIG. 2 illustrates each layer of a control plane of a radio protocol.
Figure 3:
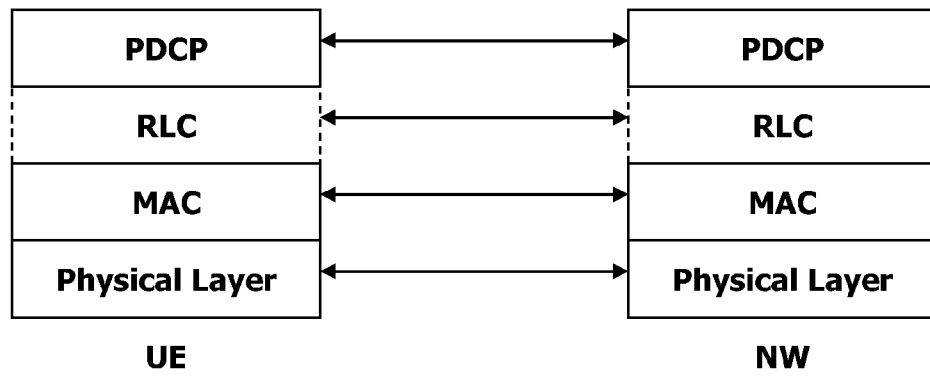
FIG. 3 illustrates each layer of a user plane of a radio protocol.
Figure 4:
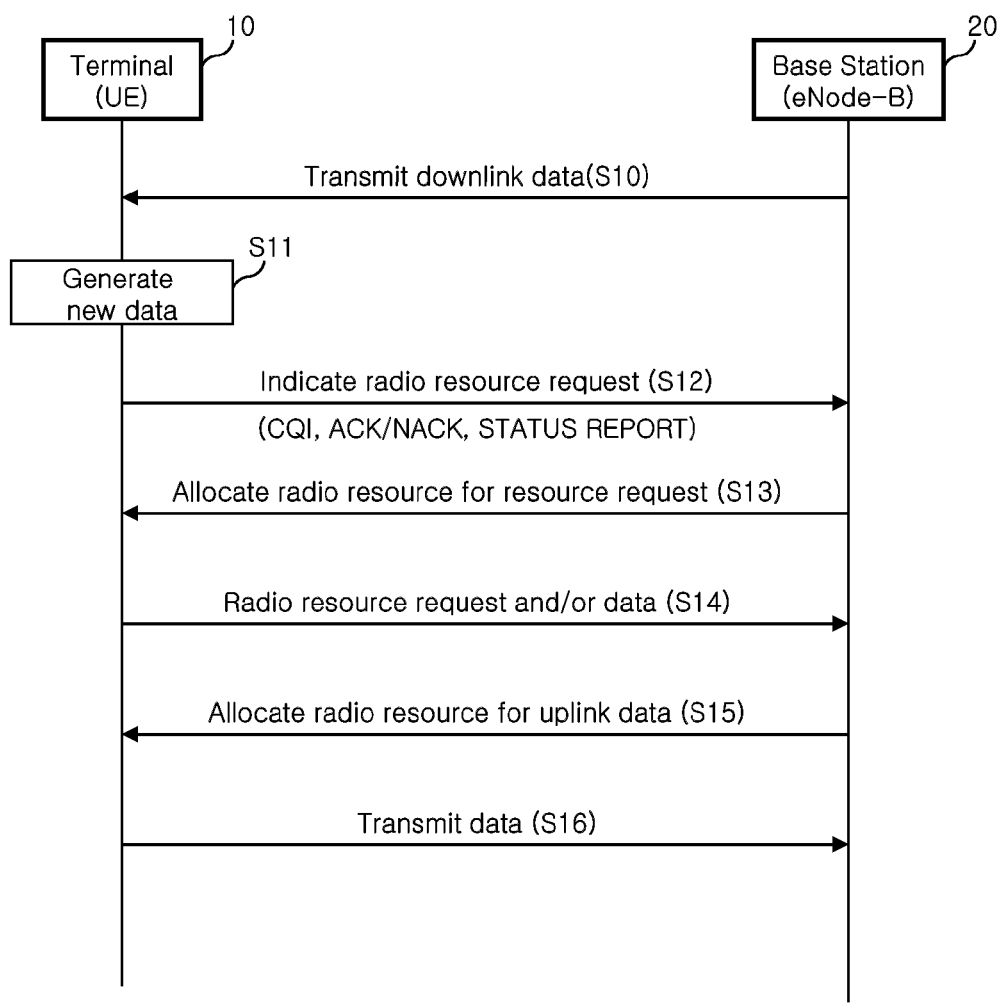
FIG. 4 illustrates a method for requesting a radio resource in a mobile telecommunications system according to one embodiment of the present invention.

FIG. 4 illustrates a method for requesting a radio resource in a mobile telecommunications system according to an embodiment of the present invention. As illustrated in FIG. 4, even though the terminal 10 (UE) receives downlink data from the base station (eNode-B) 20 (S10), the terminal currently has no uplink data to be transmitted to a base station and no uplink radio resource is allocated from the base station.

Although the terminal 10 has no data to be transmitted to the uplink, it should transmit control information, such as CQI information, HARQ ACK/NACK signaling, and a status report message to the base station 20. The CQI information reports the radio channel status of the downlink and the status report message indicates reception of data units in the RLC layer.

In other words, the terminal 10 should transmit control signals to the base station 20 during data reception from the base station even though the terminal has no data to be transmitted to the base station. Therefore, the base station 20 allocates a specific radio resource to the terminal 10 in order to allow the terminal 10 to transmit the control signals.

The terminal 10 still has no uplink radio resource allocated when new data to be transmitted is in the buffer (S11). This is because the buffer was previously empty. Accordingly, the terminal must request a radio resource from the base station 20 to transmit the new data.

The terminal 10 may use a control signal, such as CQI information, HARQ ACK/NACK signaling, and a status report of the RLC layer, to request the radio resource from the base station 20. In other words, the terminal 20 may notify the base station 20 of the request for the radio resource through the control signal (S12).

One method of the present invention requests the radio resource from the base station 20 using the control signal by adding information of 1-bit to the control signal. The information of 1-bit indicates whether the terminal 10 requests the radio resource.

Another method of the present invention for requesting the radio resource from the base station 20 using the control signal is to use existing information bits. For example, if CQI signaling is 4-bit information and bits between 0000 and 1100 are used to represent CQI information, "1111" may be used as information to request the radio resource.

The base station 20 determines whether the terminal 10 requests the radio resource through radio resource request information included in the control signal. The base station 20 allocates the radio resource to the terminal when the terminal 10 requests the radio resource so that the terminal may transmit the radio resource request message (S13).

The terminal 10 transmits the radio resource request message to the base station 20 when the uplink radio resource is allocated from the base station (S14). The radio resource request message may include the buffer status of the terminal, the priority order of the terminal, the priority order of the data, and CQI information.

The radio resource request message may additionally include data of the terminal depending on the rate of the radio resource allocated from the base station 20. For example, if the terminal 10 can send 100 bits to the radio resource allocated for transmission of the radio resource request message from the base station 20 and radio resource request message has a size of 20 bits, the terminal 10 first transmits data of 80 bits along with the radio resource request message through the allocated radio resource if the terminal 10 has the buffer size of 200 bits.

Furthermore, the terminal 10 may transmit data of the terminal without the radio resource request message if the buffer has small sized data. For example, if the base station 20 can send data of 100 bits to the radio resource allocated for transmission of the radio resource request message from the base station 20, the buffer has data of 90 bits and the radio resource request message is 20 bits, the terminal 10 includes only data of 90 bits of the buffer in the radio resource of 100 bits without the radio resource request message. The base station 20 determines that data for transmission no longer exists in the terminal if the radio resource request message is not included in the radio resource allocated for transmission of the radio resource request message.

The base station 20 allocates the radio resource to the terminal 10 (S15) after receiving the radio resource request message. As previously described, the base station 20 no longer allocates the radio resource to the terminal 10 if all the data of the terminal has been transmitted to the base station along with the radio resource request message or all the data have been transmitted to corresponding radio resources. In other words, the base station 20 can determine through information of the radio resource request message or the presence of the message whether all the data of the terminal 10 have been transmitted.

Once the terminal 10 is allocated the radio resource from the base station 20, it transmits the uplink data to the base station through the radio resource (S16).

According to the present invention, a terminal that has no radio resource may request the radio resource by using either the control signal or the RACH in order to transmit new data.

In a first method of the present invention, the terminal determines whether to use the RACH or the control signal according to a time for acquiring the radio resource. In other words, the terminal compares the sum of the RACH resource period and the time required to acquire the radio resource using the RACH with the sum of the period of the RACH resource and the time required to acquire the radio resource using the control signal and determines whether to use the RACH or the control signal.

For example, consider that the RACH resource period is $T_{RACH}$ the standby time of the terminal with respect to the next RACH resource period in which to request the radio resource as new data from the buffer is $T_{RACH-NOW}$ and the time required to acquire the radio resource for data transmission by using the RACH is $T_{RACH\_ALLOCATED\ RESOURCE}$. The sum of the time required to acquire the radio resource as new data from the terminal by using the RACH is $T_{RACH-NOW} + T_{RACH\_ALLOCATED\ RESOURCE}$.

Furthermore, consider that the standby time of the terminal for sending the next control signal to request the radio resource as new data from the buffer of the terminal is $T_{NEXT\ CONTROL}$ and the time for acquiring the radio resource for data transmission by using the control signal is $T_{CONTROL\_ALLOCATED\ RESOURCE}$. The total time required to allow the terminal to acquire the radio resource by using the control signals is $T_{NEXT\ CONTROL} + T_{CONTROL\_ALLOCATED\ RESOURCE}$.

Accordingly, the terminal compares $T_{RACH-NOW} + T_{RACH\_ALLOCATED\ RESOURCE}$ with $T_{NEXT\ CONTROL} + T_{CONTROL\_ALLOCATED\ RESOURCE}$ and uses the method having less delay time.

For example, if it takes 20 ms to acquire the radio resource using the RACH while it takes 10 ms to acquire the radio resource using the control signal when new data occurs but there is no radio resource, the terminal requests the radio resource to the base station using the control signal. By contrast, if it takes 20 ms to acquire the radio resource using of the RACH while it takes 30 ms to acquire the radio resource using the control signal when new data occurs but there is no radio resource, the terminal requests the radio resource to the base station using the RACH.

In a second method of the present invention, the terminal determines whether to use the RACH or the control signal in accordance with a data service type. In other words, the terminal uses the control signal for a data service less susceptible to delay time while using the RACH for a data service more susceptible to delay time.

For example, the terminal uses the control signal even though it takes 15 ms when using the RACH while it takes 20 ms when using the control signal for a data service, such as an internet service, that are less susceptible to delay time. The RACH resource may be allocated at a relatively small range when it is desirable in view of efficiency of the radio resource since the terminal requests the radio resource by separately using the RACH and the control signal. By contrast, the terminal uses the RACH for a traffic service susceptible to delay time.

In a third method of the present invention, the terminal determines whether to use the RACH or the control signal in accordance with a priority order of the data. In other words, the terminal uses the RACH for a service having high priority while it uses the control signal for a service having low priority.

The terminal also calculates the total time required to acquire the radio resource using the RACH or the control signal and selectively uses either the RACH or control signal based on the less total time for a service having high priority. The terminal always uses control signal for a service having low priority.

According to the present invention, fast data transmission is ensured for each terminal since the terminal can quickly and effectively transmit the radio resource request message to the base station and can quickly acquire the radio resource from the base station.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore all changes and modifications that fall within the metes and bounds of the claims, or equivalents of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for scheduling radio resources in a mobile communications system, the method comprising:
   transmitting a control signal comprising an indication that a radio resource is requested;
   receiving a first allocated radio resource; and
   transmitting a message using the first allocated radio resource.

2. The method of claim 1, wherein the message comprises a request for a second radio resource if an amount of data left to transmit is more than an amount of data that can be transmitted using the first allocated radio resource or the message comprises only data if the amount of data left to transmit is less than or equal to the amount of data that can be transmitted using the first allocated radio resource.

3. The method of claim 1, wherein the message is a request for a second radio resource and further comprising:
   receiving a second allocated radio resource; and
   transmitting data using the second allocated radio resource.

4. The method of claim 3, wherein the request for the radio resource comprises data.

5. The method of claim 1, wherein the control signal comprises one of CQI information, an ACK/NACK and a status report message.

6. A method for scheduling radio resources in a mobile telecommunications system, the method comprising:
   transmitting an indication that a radio resource is requested, the indication included in one of a preamble transmitted over a random access channel (RACH) and a control signal transmitted over a control channel;
   receiving a first allocated radio resource;

transmitting a request for a second radio resource using the first allocated radio resource, the request comprising data;

receiving a second allocated radio resource; and transmitting data using the second allocated radio resource.

7. The method of claim 6, wherein transmitting the indication that a radio resource is requested comprises:

Including the indication into one of the preamble and the control signal according to the determining step.

8. The method of claim 6, wherein transmitting the indication that a radio resource is requested comprises:

determining a data service type.

9. The method of claim 8, wherein transmitting the indication that a radio resource is requested comprises:

including the indication that a radio resource is requested in the preamble if the data service type is susceptible to delay time or including the indication that a radio resource is requested in the control signal if the data service type is not susceptible to delay time.

10. The method of claim 6, wherein transmitting the indication that a radio resource is requested comprises:

determining a data service priority.

11. The method of claim 10, wherein transmitting the indication that a radio resource is requested comprises:

calculating a first time required to acquire the radio resource using the RACH and a second time required to acquire the radio resource using the control signal and including the indication in one of the preamble and the control signal according to which of the calculated first time and second time is less if the data service is determined to have high priority.

12. The method of claim 10, wherein transmitting the indication that a radio resource is requested comprises:

including the indication in the control signal if the data service is determined to have low priority.

13. A method for scheduling radio resources in a mobile telecommunications system, the method comprising:

receiving a control signal comprising an indication that a radio resource is requested;

transmitting a first allocated radio resource; and receiving a message transmitted using the first allocated radio resource.

14. The method of claim 13, wherein the message comprises a request for a second radio resource if an amount of data left to transmit in a mobile terminal that transmitted the message is more than an amount of data that can be transmitted using the first allocated radio resource or the message comprises only data if the amount of data left to transmit in the mobile terminal is less than or equal to the amount of data that can be transmitted using the first allocated radio resource.

15. The method of claim 13, wherein the message is a request for a second radio resource and further comprising:

transmitting a second allocated radio resource; and receiving data transmitted using the second allocated radio resource.

16. The method of claim 15, wherein the request for the radio resource comprises data.

17. The method of claim 13, further comprising:

determining whether data is left for transmission in a mobile terminal from which the message was received.

18. The method of claim 13, wherein the control signal comprises one of CQI information, an ACK/NACK and a status report message.

19. A method for scheduling radio resources in a mobile telecommunications system, the method comprising:

receiving an indication that a radio resource is requested, the indication included in one of a preamble transmitted over a random access channel (RACH) and a control signal transmitted over a control channel;

transmitting a first allocated radio resource;

receiving a request for a radio resource transmitted using the first allocated radio resource, the request comprising data;

transmitting a second allocated radio resource; and receiving data transmitted using the second allocated radio resource.

20. The method of claim 19, wherein the indication that a radio resource is requested is received in the preamble if a data service type is susceptible to delay time or the indication is received in the control signal if the data service type is not susceptible to delay time.

21. The method of claim 19, wherein the indication that a radio resource is requested is received in the preamble if a data service has high priority and a time required for a mobile communication terminal transmitting the indication to acquire the radio resource using the RACH is less than a time required for the mobile communication terminal to acquire the radio resource using the control signal.

22. The method of claim 19, wherein the indication that a radio resource is requested is received in the control signal if the data service has low priority or the data service has high priority and the time required for the mobile communication terminal to acquire the radio resource using the RACH is more than the time required for the mobile communication terminal to acquire the radio resource using the control signal.

* * * * *

UNITED STATES PATENT AND TRADEMARK OFFICE
CERTIFICATE OF CORRECTION

| | | |
|---|---|---|
| PATENT NO. | : 8,081,660 B2 | |
| APPLICATION NO. | : 12/278562 | |
| DATED | : December 20, 2011 | |
| INVENTOR(S) | : Sung-Jun Park et al. | |

It is certified that error appears in the above-identified patent and that said Letters Patent is hereby corrected as shown below:

Column 10, lines 37-43, Claim 1 should be as follows:
1. A method for scheduling radio resources in a mobile communications system, the method comprising:
    --calculating a first time required to acquire a radio resource using a preamble transmitted over a random access channel (RACH) and a second time required to acquire the radio resource using a control signal transmitted over a control channel;--
    --determining which of the calculated first time and second time is less;--
    transmitting "a" --the-- control signal comprising an indication that "a" --the-- radio resource is requested
--when the second time is determined to be less than the first time--;
    receiving a first allocated radio resource; and
    transmitting a message using the first allocated radio resource.

Column 10, line 61 through Column 11, line 6, Claim 6 should be as follows:
6. A method for scheduling radio resources in a mobile telecommunications system, the method comprising:
    transmitting an indication that a radio resource is requested, the indication included in one of a preamble transmitted over a random access channel (RACH) and a control signal transmitted over a control channel;
    receiving a first allocated radio resource;
    transmitting a request for a second radio resource using the first allocated radio resource, the request comprising data;
    receiving a second allocated radio resource; and
    transmitting data using the second allocated radio resource--,--
    --wherein transmitting the indication that a radio resource is requested comprises:
        calculating a first time required to acquire the radio resource using the RACH and a second time required to acquire the radio resource using the control signal, and
        determining which of the calculated first time and second time is less--.

Signed and Sealed this
Fourth Day of December, 2012

David J. Kappos
*Director of the United States Patent and Trademark Office*

CERTIFICATE OF CORRECTION (continued)
U.S. Pat. No. 8,081,660 B2

Column 11, lines 7-10, Claim 7 should be as follows:
7. The method of claim 6, wherein transmitting the indication that a radio resource is requested --further-- comprises:
 "Including" --including-- the indication into one of the preamble and the control signal according to the determining step.

Column 11, lines 11-13, Claim 8 should be as follows:
8. The method of claim 6, wherein transmitting the indication that a radio resource is requested --further-- comprises:
 determining a data service type.

Column 11, lines 14-20, Claim 9 should be as follows:
9. The method of claim 8, wherein transmitting the indication that a radio resource is requested --further-- comprises:
 including the indication that a radio resource is requested in the preamble if the data service type is susceptible to delay time or including the indication that a radio resource is requested in the control signal if the data service type is not susceptible to delay time.

Column 11, lines 21-23, Claim 10 should be as follows:
10. The method of claim 6, wherein transmitting the indication that a radio resource is requested --further-- comprises:
 determining a data service priority.

Column 11, lines 24-31, Claim 11 should be as follows:
11. The method of claim 10, wherein transmitting the indication that a radio resource is requested --further-- comprises:
 calculating "a" --the-- first time required to acquire the radio resource using the RACH and "a" --the-- second time required to acquire the radio resource using the control signal and including the indication in one of the preamble and the control signal according to which of the calculated first time and second time is less if the data service is determined to have high priority.

Column 11, lines 33-36, Claim 12 should be as follows:
12. The method of claim 11, wherein transmitting the indication that a radio resource is requested --further-- comprises:
 including the indication in the control signal if the data service is determined to have low priority.

Column 11, lines 37-43, Claim 13 should be as follows:
13. A method for scheduling radio resources in a mobile telecommunications system, the method comprising:
receiving a control signal --from a mobile terminal, the control signal-- comprising an indication that a radio resource is requested"";""--, wherein the mobile terminal is configured to:--

--calculate a first time required to acquire a radio resource using a preamble transmitted over a random access channel (RACH) and a second time required to acquire the radio resource using the control signal transmitted over a control channel,--
--determine which of the calculated first time and second time is less, and--
--transmit the control signal comprising the indication that the radio resource is requested when the second time is determined to be less than the first time;--
transmitting a first allocated radio resource; and
receiving a message transmitted using the first allocated radio resource.

Column 12, lines 16-28, Claim 19 should be as follows:
19. A method for scheduling radio resources in a mobile telecommunications system, the method comprising:
receiving an indication that a radio resource is requested, the indication included in one of a preamble transmitted over a random access channel (RACH) and a control signal transmitted over a control channel;
transmitting a first allocated radio resource;
receiving a request for a radio resource transmitted using the first allocated radio resource, the request comprising data;
transmitting a second allocated radio resource; and
receiving data transmitted using the second allocated radio resource--,--
--wherein the indication that a radio resource is requested is received in the preamble if a time required for a mobile communication terminal transmitting the indication to acquire the radio resource using the RACH is less than a time required for the mobile communication terminal to acquire the radio resource using the control signal or the indication is received in the control signal if the time required for the mobile communication terminal to acquire the radio resource using the RACH is more than the time required for the mobile communication terminal to acquire the radio resource using the control signal--.